United States Patent [19]

Greenfield et al.

[11] 3,716,458
[45] Feb. 13, 1973

[54] PROCESS AND APPARATUS FOR RECOVERING CLEAN WATER FROM DILUTE SOLUTIONS OF WASTE SOLIDS

[75] Inventors: Charles Greenfield, Murray Hill; Robert E. Casparian, Boonton; Anthony J. Bonanno, Parsippany, all of N.J.

[73] Assignee: Carver-Greenfield Corporation, Hanover, N.J.

[22] Filed: Sept. 18, 1970

[21] Appl. No.: 73,336

[52] U.S. Cl. ............203/11, 203/89, 202/174, 202/236, 159/1 R, 159/13 R, 159/49, 99/149, 99/199
[51] Int. Cl. .........B01d 3/00, B01d 3/08, B01d 3/02, B01d 1/00, B01b, A23c 5/00
[58] Field of Search.....159/1 R, 47 R, 49, 29, 17 VS, 159/17, 4 A, DIG. 25; 99/149, 199; 162/30; 23/259.3; 203/10, 89, 25, 11; 202/174, 236; 208/187, 188; 210/21

[56] References Cited

UNITED STATES PATENTS

| 2,230,196 | 1/1941 | Clayton | 159/48 R X |
| 2,100,277 | 11/1937 | Clayton | 233/11 X |
| 2,888,449 | 5/1959 | Borck | 260/112 |
| 3,323,575 | 6/1967 | Greenfield | 159/13 A |
| 3,468,674 | 9/1969 | Levin | 99/199 X |
| 3,545,518 | 12/1970 | Kohlmann | 159/47 R X |

Primary Examiner—Norman Yudkoff
Assistant Examiner—J. Sofer
Attorney—Richard L. Cannaday

[57] ABSTRACT

An improved process and apparatus for recovering clean water from dilute solutions of waste solids. A dilute stream of waste solids is concentrated by evaporation and the evaporated water is condensed and recovered. The waste solids in concentrated solution are mixed with oil and subject to further drying by evaporation. Again the evaporated water is condensed and recovered. If desired, the waste solids may be separated from the oil which may then be recycled.

13 Claims, 1 Drawing Figure

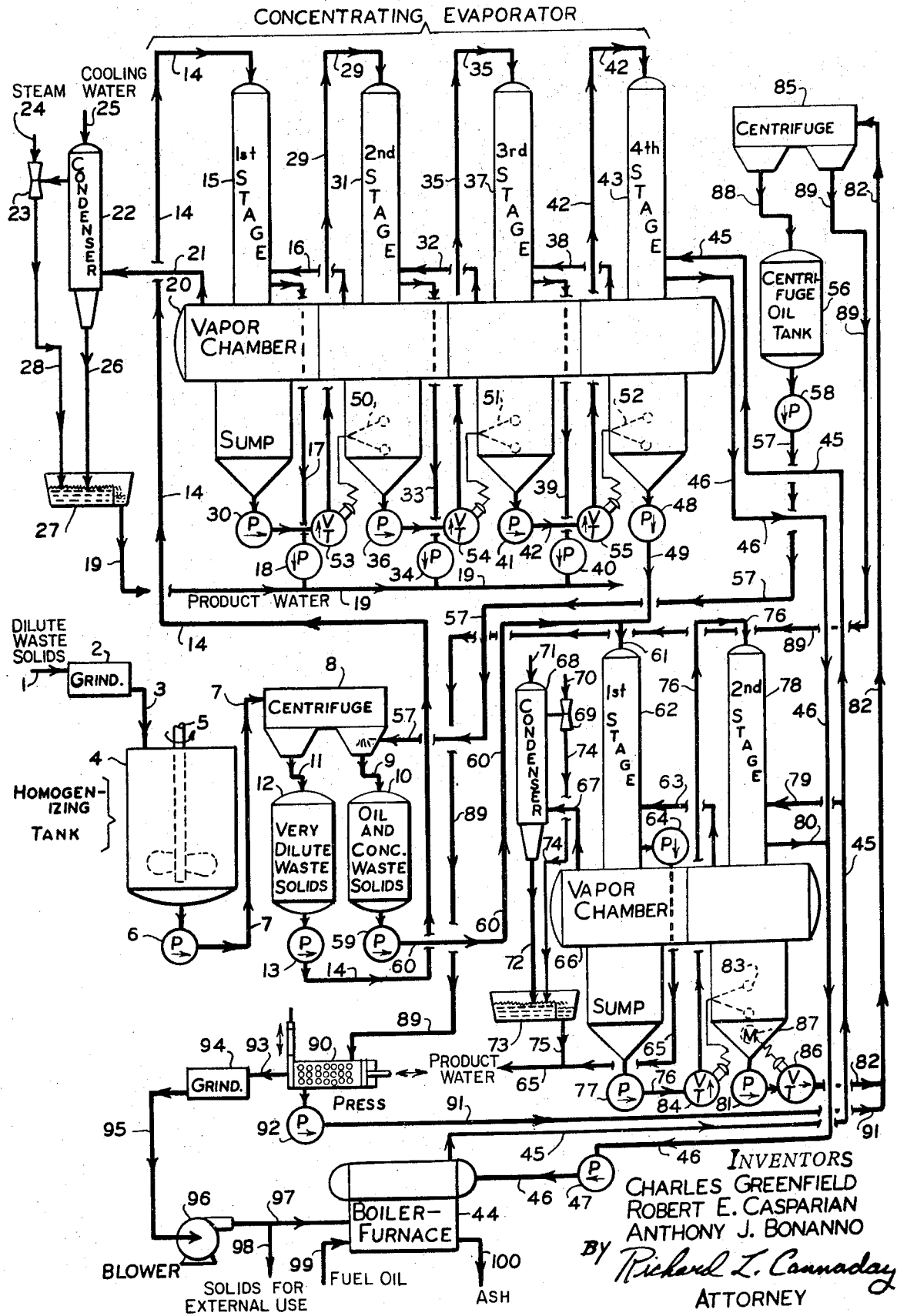

PROCESS AND APPARATUS FOR RECOVERING CLEAN WATER FROM DILUTE SOLUTIONS OF WASTE SOLIDS

BACKGROUND OF THE INVENTION

The economic disposal of waste solids and recovery of clean water from dilute solutions thereof is a recognized problem. Ideally, apparatuses and processes for the recovery of water from dilute solutions of waste solids should provide ease of disposition of all waste constituent, avoidance of pollution, economic operation and hygienic handling, and should, in addition and particularly, yield clean water. Furthermore, in the course of recovering clean water it is desirable to obtain by-products, both solid and liquid, which are either valuable in themselves or can be utilized to further the economics of the process. For purposes of this invention it is to be understood that the word "solution" as used in the expression "dilute solution" is employed generically to include suspensions, dispersions and mixtures and other forms of fluid association of solids in liquids, especially waste solids in water, which may not be solutions in the strict sense for all purposes.

In the customary processing known to the prior art dilute solutions of waste solids such as industrial wastes and raw sewage are treated by settling, aeration, chemicals and filtering to generate a stream of water that is sufficiently clean to be discharged to a region of ultimate disposal such as a natural stream or river. The effluent that is discharged at this point is at best not sufficiently clean to be used for domestic consumption but must go through a long, natural aerobic clean-up before being suitable for such purposes. In the case where the dilute waste is raw sewage or the effluent from, for example, a canning factory or slaughter house, in addition to the relatively clean water that is discharged to the region of ultimate disposal there is often obtained a watery sludge which is discharged to a closed tank called a digester. The digester is of sufficient volume that sludge which it receives may have a dwell time therein of 30 days or longer. Heating means such as hot water coils are provided in the digester, and the sludge is maintained at an elevated temperature to provide an aerobic bacterial digestion of the organic constituents which break down the solids in part to gaseous material. The gaseous material may have a substantial content of methane and thus be drawn off continuously to be burned as a fuel for heating the water circulated through the digester coils. Solids in a stream which may have a water content of about 95 percent are drawn off from the digester and spread out in large drying beds for final evaporative drying. The resultant dry solids may be incinerated or disposed of to farms for fertilizer or other possible uses.

SUMMARY OF THE INVENTION

The apparatus and process of this invention comprise a systematic arrangement of equipment and a series of steps for treating dilute solutions of waste solids whereby substantially all the water therein is recovered in a significantly purified or essentially clean state or condition. For purposes of this invention clean water is water obtained by evaporation followed by condensation, free of suspended or dissolved solids although possibly containing some steam-distilled components. The process and apparatus of the present invention replace the aforementioned settling, aeration, chemical treatment and filtration steps and the apparatus for carrying them out as well as all traditional subsequent apparatus and steps of sludge and solids treatment in a digester and drying beds.

It is therefore an object of this invention to provide a process and an apparatus for the recovery of clean water from dilute solutions of waste solids.

It is another object of this invention to provide a process and an apparatus capable of recovering substantially all the water in an essentially clean state from dilute solutions of waste solids.

It is yet another object of this invention to provide a process and an apparatus well adapted to recover from dilute solutions of waste solids valuable by-products such as dry solids including dry and substantially oil-free solids.

These and other objects of the present invention as well as its nature and substance will become apparent to those skilled in the art from the following description and claims considered in connection with the accompanying drawing.

Broadly, viewed in one of its principal aspects, this invention comprises a process for recovering clean water from dilute solutions of waste solids according to the following steps:

1. Concentrating said dilute solutions of waste solids by heat evaporation to yield waste solids in concentrated solution and water vapor;
2. Condensing said water vapor;
3. Admixing said concentrated waste solids with a relatively non-volatile oil to obtain a mixture which will remain fluid and pumpable after the removal of the water content therefrom;
4. Subjecting the resultant oil-containing mixture to dehydration by heat evaporation to yield water vapor and a substantially anhydrous waste solids in oil slurry, and
5. Condensing said water vapor from said dehydration step.

The foregoing process is carried out in an apparatus for recovering clean water from dilute solutions of waste solids, said apparatus comprising a systematic arrangement of items of equipment as follows:

1. A tank adapted to receive a stream of said dilute solution of waste solids and provided with a stirring or mixing mechanism for homogenizing the dilute solution,
2. A first evaporator,
3. A conduit extending from said tank to said first evaporator wherethrough may flow a stream of waste solids in dilute solution from said tank into the evaporating region of said first evaporator,
4. A first condenser,
5. A conduit extending from said first evaporator to said first condenser through which may flow water vapor formed as a result of heating of said dilute solution of waste solids,
6. A second evaporator,
7. A combustion apparatus associated with both said evaporators for supplying evaporative heat thereto,
8. A conduit extending from said first evaporator to the evaporating region of said second evaporator wherethrough may flow a stream of waste solids in concentrated solution from said first evaporator,
9. An oil reservoir, 10. Means for transmitting oil from said oil reservoir to said conduit extending from said first evaporator to said second evaporator whereby a mixed stream of concentrated waste solids and oil may be conducted into the evaporating region of said second evaporator, 11. A second condenser, and 12. A conduit extending from said second evaporator to said second condenser through which may flow water vapor formed as a result of heating of said concentrated waste solids and oil mixture.

DESCRIPTION OF THE PREFERRED EMBODIMENTS

The water recovery process of this invention as applied to dilute solutions of waste solids thus comprises the steps of evaporatively concentrating the waste solids in dilute solution with recovery of the evaporated water; mixing the waste solids now in concentrated solution with an oil to obtain a mixture which will remain fluid and pumpable even after the removal of essentially its entire water content, and subjecting the resulting mixture of solids, water and oil to a dehydration step by heat evaporation with subsequent recovery of the evaporated water and a substantially anhydrous slurry of waste solids in oil. In one embodiment of this invention, a dilute solution of waste solids is separated into a very dilute portion and a relatively concentrated portion by means such as filtration or centrifugation. The very dilute portion is then concentrated as described above and the resulting concentrated waste solids combined with the initial concentrated portion, dispersed in oil and subjected to final dehydration.

The essentially anhydrous slurry of waste solids in oil may, if desired, be separated to yield the oil and the waste solids in a largely dry and oil-free condition. This may be accomplished by mechanical pressure of either a static or a dynamic variety, or both, on the anhydrous slurry whereby the greater part of the oil is expressed from the solids. In some cases, as in the processing of sewage or slaughter house wastes, the waste itself contains an appreciable amount of oil independently of oil which may be added to it prior to the dehydration step. This oil will be carried through the dehydration step along with the waste solids and the added oil and be subjected to being pressed out of the dehydrated slurry along with the added oil. If the dry or essentially water-free slurry be pressed sufficiently vigorously, it may thus be made to yield oil in a quantity or at a rate equal to or in excess of that in or at which oil was previously added to the concentrated waste solids. Generally it is desirable that the pressing step yield enough oil for the dehydration step that the process will be self-sufficient with respect to oil requirements. Even more desirably, in some cases the pressing step will generate somewhat more oil than is needed for the dehydration step so that the process will provide a net oil yield.

The dry waste solids left after the pressing operation may often be utilized for purposes outside the process itself and thus constitute a process product. The process and apparatus of this invention may be used to recover clean water from dilute solutions of waste solids derived from numerous sources. Thus, for example, this invention finds utility in the recovery of water from a variety of materials which are found in aqueous solution or water dispersion, e.g., powdered coal, cement, spent lime, inorganic salts, sewage, slaughter house effluent, slimes, black liquor from the paper industry, cannery or canning factory effluent, etc. Accordingly, depending on the source, the dry waste solids recovered from the pressing operation may be used as fertilizer or possibly as animal feed. Further, since they are often burnable, they may be used as fuel for the generation of steam needed to run the evaporator components of the apparatus for the concentration step and the dehydration step, and also the steam needed to run auxiliary equipment such as pumps, either directly if they be steam-driven pumps or indirectly if they be motor driven pumps and the steam is used to run a turbogenerator directly. The process may thus be at least partly self-sufficient in respect of fuel requirements. The process and apparatus of this invention thus provide means for the recovery of essentially clean water from dilute solutions of waste solids and, in addition, allow for the recovery of valuable by-products therefrom.

The material to be treated by the process of this invention should contain solids particles having a maximum size of about one-fourth inch. Larger particles may be ground to size or comminuted by existing techniques.

The oils which are utilized for admixture with the waste solids in concentrated solution are inert, relatively non-volatile oils or fats, or other oil-like materials. Typical of these are tallow, other animal fats and vegetable oils, all of which often can be derived directly from the process operation; petroleum oils and their fractions and derivatives including fuel oils; glycerines, glycols and mixtures thereof; and miscellaneous liquid wastes from industrial plants, being generally of an organic nature. It is desirable to employ an oil that imparts process credits, i.e., one that can add value to the solids product, such as waste oils normally found in sewage or industrial waste, or fuel oils, or, as suggested above, employ oils derived in the practice of the process itself so as to minimize cost factors. The quantity of oil is such that its ratio in the system is in the range of about two to about 20 parts by weight, based on each part of non-fat solids. This refers to total oil, i.e., that added plus that derived from the process for reuse. This amount of oil gives a fluid, pumpable mixture even in the absence of water. The term "fluid" as used here is intended to be synonomous with "liquid", i.e., taking the shape of the container to the extent that the mixture fills the container. This will also include heavy, viscous fluids which are pumpable but still suitable for heat transfer purposes.

While the concentration step and the dehydration step of this invention may each be carried out in the single stage or single effect evaporators known in the art, it is preferred that each of these steps be accomplished in a plurality of sequential heat evaporation steps wherein each of the successive evaporation steps is at a successively higher temperature and the resulting waste solids streams are of successively higher concentration because of increasing dehydration, the evolved vapors of each evaporation step supplying a substantial portion of the heat requirements of the preceding heat evaporation step. Thus the plurality of sequential heat evaportion steps connotes at least two. The equipments that can be employed are multiple-effect evaporators known in the art, e.g., Mojonnier, Bufflovak, Rodney- Hunt, etc. Functionally, evaporator equipment may be of the forced circulation, flash, falling film recirculation, single pass, rotary wiped film, or indeed any suitable type. The temperatures, pressures and concentrations in each of the successive series of evaporation steps are largely empiric in nature, depending upon the systems and oils being employed.

Normal processing temperatures for the initial concentration of the dilute waste solids mixtures may be in the range of about 70°F to about 200°F in the first stage and about 130°F to about 250°F in the second, third or final stages of a multi-effect evaporating system. The preferred processing temperatures are in the range of about 90°F to about 175°F in the first stage and about 150°F to about 220°F in the second, third or last stages. The normal processing temperatures for the dehydration of the oil-concentrated waste solids mixture may be in the range of about 70°F to about **°F in the first stage and about 150°F to about 400°F in the second, third or final stages of a multi-effect drying system. The preferred processing temperatures are in the range of about 90°F to about 175°F in the first stage and about 200°F to about 350°F in the second, third or last stages. The foregoing ranges and progressions of temperatures are reasonable in the case where the flows through the evaporator of the mixture being concentrated or dehydrated and the heating or drying steam are substantially countercurrent, the evaporator in this mode of operation being called a "backward flow" evaporator. The temperatures also depend on the desired quality of the end product and economics of fuel utilization, cooling water availability, capital investment, etc.

In the foregoing paragraph the expression "first stage" refers to that part of the evaporator equipment in which the dilute waste solids mixture or the oil-concentrated waste solids mixture is subjected to the first step of a sequential plurality of evaporation steps, two or three or more corresponding to "second stage", "third stage," etc. The expression "effect," on the other hand, as in "multiple-effect" or "multi-effect," is related to the flow and action of the heating medium, customarily steam, in the evaporator equipment. Where the flow of a dilute solution of waste solids or an oil-concentrated waste solids mixture being heated and evaporated is countercurrent to that of the heating steam (backward flow), the first stage of the evaporator is the same as its last effect.

The pressures are not critical and are controlled with temperatures to achieve desired evaporation rates in a given design. Thus the first stage pressure will conveniently be from about ½ inch Hg absolute to approximately atmospheric. The pressures then increase in successive stages responsive to the temperatures in the aforedescribed countercurrent or backward flow case. It is advantageous to operate the first stage at subatmospheric pressures, and the final stages at close to atmospheric.

The advantage of the sequential evaporation steps may be seen from the following. For example, in a double-effect evaporator with feed entering at 80°F, the material can leave the evaporator at 225°–250°F with ratios of approximately 1 pound of steam utilized for approximately 1 ½ to 1 ¾ pounds of water evaporated; whereas in normal single-effect operations about 1 ½ pounds of steam could be required to achieve the same result with only 1 pound of water evaporated. If triple or more effect evaporation be utilized, even further economies in fuel consumption are made possible. It should be noted that the evolved vapors from each of the heat evaporation steps after the first step supply a substantial portion of the heat requirement of the preceding heat evaporation step or stage in the case of a backward flow evaporator. The only net or external heat input required is that needed to raise the temperature of the components to evaporation temperatures and make good for heat losses.

About 95 percent of the recovered water is derived from the evaporative concentration step of the dilute waste solids mixture and the remaining approximately 5 percent of the recovered water comes from the dehydration of the oil-concentrated waste solids mixture. The water from the concentration step may be combined with that from the dehydration step or, alternatively, water from the two steps or operations may be kept separate. The final product from the dehydration step is generally a substantially anhydrous oil-waste solids slurry containing no more than about 5–10 weight percent water on a non-fat basis. The water content is such as to permit fuel efficiency when the waste solids which have been separated from the oil are burned or representation of those solids as being in an essentially dry state when they are disposed of as a marketable product. Thus, by operating with and according to the disclosed apparatus and process substantially all the water is recovered from a dilute waste solids solution feed or raw material in an essentially clean state.

This invention will be more clearly perceived and better understood through reference to the following examples and preferred embodiments as discussed in further detail in connection with the flow diagram shown in the drawing. According to that diagram, to commence the description thereof, a stream of waste solids in dilute aqueous solution or dispersion enters grinder or comminutor 2 through line 1. From grinder 2 the dilute waste solids stream containing solid particles having a maximum size of about one-fourth inch flows into mixing tank 4 through line 3. The fluid system is homogenized or agitated in mixing tank 4 by means of stirring device 5 and then withdrawn from the mixing tank by means of pump 6. Pump 6 delivers the dilute slurry or solution of waste solids in water through line 7 to centrifuge 8. Centrifuge 8 separates the slurry of dilute waste solids into two streams. One of the streams comprised of wet waste solids is discharged through line 9 to tank 10. The other stream comprised of water containing only very small quantities of waste solids is discharged through line 11 to tank 12. The very dilute waste solids mixture is withdrawn from tank 12 by means of pump 13.

Pump 13 delivers the very dilute waste solids mixture through line 14 to the first stage or fourth effect evaporator 15 of an overall concentrating evaporator assembly or array. In evaporator 15 water is boiled off at a subatmospheric pressure which may typically be about 2 inches Hg absolute. The temperature of the partially concentrated product of the entering dilute waste solids solution or mixture is in the range of about 70°–200°F and preferably about 90°–175°F, depending on the pressure in the evaporator. The system is heated by vapor from line 16 which is at a temperature about 30°–40°F higher than the temperature of the partially concentrated dilute solution of waste solids. Condensate of the heating vapor is withdrawn through line 17 by means of pump 18 and discharged by it into product water outlet line or conduit 19. Water vapor formed as a result of the concentration of the entering dilute waste solids mixture is removed from vapor chamber 20 through line 21 into barometric condenser 22 within which a partial vacuum is maintained by means of ejector 23 supplied with steam through line 24.

Water vapor entering condenser 22 through line 21 is mixed with and condensed by cooling water entering the condenser through line 25, and the resulting stream of warm water is discharged through line 26 into hot well 27. Hot well 27 also receives the steam and non-condensable gases leaving ejector 23 through line 28, and the water in that well serves to condense this steam with the non-condensables escaping at and from the water surface. From the hot well product water is drawn off continuously through product water outlet line 19. If desired, part of the produce water may be reused throughout the water recovery plant. Alternatively, all the recovered water may be stored in a reservoir for later use in applications in which essentially clean water is required.

The partially concentrated slurry of waste solids in water from evaporator 15 is continuously removed through line 29 and discharged by pump 30 to second stage 31 of the concentrating evaporator. In the second stage evaporator a procedure is followed similar to that in the first stage except that the pressure is generally higher. The pressure in each succeeding evaporator stage is usually somewhat higher than in the preceding stage, approaching approximately atmospheric pressure in the last stage. The temperature of the further concentrated product of the second stage evaporator is in the range of about 130°–250F and preferably about 150°–220°F, depending on the pressure in the evaporator. The heating medium is steam which is at a temperature about 30°–40°F higher than the temperature of the further concentrated waste solids slurry or feed material leaving the second stage evaporator. The heating steam comes through line 32 from the vapor chamber of the third or succeeding evaporator stage. Condensate of the heating steam is withdrawn through line 33 by pump 34 and is discharged by it into product water outlet line 19.

The further concentrated slurry of waste solids in water withdrawn from second stage evaporator 31 is discharged through line 35 by pump 36 to third stage 37 of the concentrating evaporator. The pressure in the third stage is generally higher than that in second stage evaporator 31, but is advantageously somewhat less than atmospheric. The temperature of the still further concentrated waste solids product material leaving the third stage is within the range of about 130°–250°F, preferably about 150°–220°F, and is usually somewhat higher than that from second stage evaporator 31. The heating medium is steam at a temperature about 30°–50°F higher than that of the product, and it comes from the vapor chamber of the succeeding or fourth stage of the concentrating evaporator through line 38. Condensate of the heating steam is withdrawn through line 39 and discharged by pump 40 into product water outlet line 19.

The still further concentrated slurry of waste solids in water withdrawn from third stage evaporator 37 is discharged by pump 41 through line 42 to fourth stage 43 of the concentrating evaporator. The pressure in the fourth stage is usually higher than that in the third stage, advantageously being approximately atmospheric. The temperature of the product of fourth stage evaporator 43, i.e., waste solids significantly reduced in water content from their condition entering the concentrating evaporator through line 14, is generally greater than that of the product of third stage evaporator 37 and is within the range of about 130°–250°F, preferably about 150°–220°F. The heating medium is steam at a temperature about 30°–50°F higher than that of the even still further concentrated waste solids product material. This steam is generated in boiler-furnace 44 and conveyed to fourth stage 43 of the concentrating evaporator through line 45. Condensate of the heating steam is withdrawn through line 46 and returned by pump 47 to the boiler-furnace. The product waste solids material now existing as a concentrate in water solution or dispersion is withdrawn from fourth stage evaporator 43 by pump 48 and discharged by it into line 49.

Level control in the second, third and fourth stages of the concentrating evaporator equipment is maintained by a level sensing element in the slurry sump of each of these stages which transmits signals to a throttle valve following the pump in the slurry pumping line wherethrough the stage in question is supplied. As shown, level sensing elements 50, 51 and 52 in the slurry sumps of second, third and fourth evaporator stages 31, 37 and 43, respectively, control pump discharge throttle valves 53, 54 and 55 in slurry feed lines 29, 35 and 42, respectively. Although not shown, a level sensing element could be installed in the slurry sump of first stage 15 of the concentrating evaporator to transmit control signals to a throttle valve, also not shown, in feed line 14. Such a valve would be installed on the outlet or discharge side of pump 13 withdrawing a stream of very dilute waste solids in water solution or dispersion from tank 12. The evaporator level control system so far illustrated and described is considered to be of a conventional nature and does not by itself constitute part of the present invention. This observation is applicable also to evaporator level controls described and/or illustrated hereinafter.

The matter of the degree of concentration of the waste solids in the whole stream of material withdrawn from the concentrating evaporator by pump 48 may be considered in at least qualitative terms. This stream of material must be at least sufficiently fluid to be pumpable with essentially all of its fluidity coming from its water content although, depending upon the nature of the original waste material supplied to the illustrated system through line or conduit 1, some oils or fluid fats may be present also and make some contribution to fluidity. As an example of an extreme condition in one direction, assuming that fluidity is due essentially entirely to water content and assuming further that the concerned waste solids are insoluble paper fiber wastes, a solids concentration of no more than about 3 to 4 percent by weight could be achieved in the material withdrawn by pump 48. As an example of an opposite extreme, again assuming that fluidity is due essentially entirely to water content, but now with the further assumption of the concerned waste solids being soluble solids of black liquor from a paper mill, a solids concentration up to about 50 percent by weight might well be obtainable. Generally, solids which are soluble in water may be concentrated to a much greater extent than those which are insoluble.

It may be assumed in any case that the non-fat waste solids content in the stream of feed material to the concentrating evaporator through line 14 is very low indeed, probably not more than ½ percent by weight and in many particular instances appreciably less than that. For evaporator design calculation purposes, therefore, the stream of material fed through line 14 may be regarded as essentially entirely water. The number of stages going to make up the overall concentrating evaporator, four or more or less, will depend to a great extent in any specific case on the percentage amount of water to be removed in and by the concentrating evaporator. As suggested hereinbefore that in turn is a function of the amount of water which must be left in association with the waste solids to assure pumpability of the slurry in the sump of the last stage of that evaporator.

Returning to detailed consideration of the drawing, oil from centrifuge oil tank 56 is delivered through line 57 by pump 58 into the particular outlet of centrifuge 8 through which are discharged the wet waste solids which contain about 5–10 percent by weight of water. There the wet waste solids are mixed with the oil in a ratio that yields a pumpable fluid mixture or slurry capable or remaining pumpable even after evaporation of its relatively small remaining water content and the mixing with it of the waste solids in the material leaving the sump of the last stage of the concentrating evaporator. The slurry of wet waste solids in oil may contain for each hundred parts of wet waste solids about 200 to about 2,000 parts of oil. That slurry flows through line 9 into tank 10, and from there it is withdrawn and discharged by pump 59 through line 60 which meets line 49 at a "T" joint or connection. There the slurry of wet waste solids in oil becomes mixed with the wet waste solids discharged from the slurry sump of fourth stage 43 of the concentrating evaporator, and the resulting combined slurry of wet waste solids in oil flows through leg 61 of the "T" into first stage 62 of a two-stage drying evaporator.

In the first stage of the drying evaporator water is boiled off at a subatmospheric pressure which may typically be about 5–10 inches Hg. absolute. The temperature of the partially dehydrated product of the entering slurry is in the range of about 70°–250°F and preferably about 90°–175°F, depending upon the pressure in the evaporator. The system is heated by vapor from line 63 which is at a temperature about 30°–40°F higher than the temperature of the partially dehydrated product slurry of waste solids in oil. Condensate of the heating vapor is discharged by pump 64 into product water outlet line or conduit 65. Water vapor formed as a result of the partial dehydration of the entering slurry of wet waste solids in oil is removed from vapor chamber 66 of the first stage of the drying evaporator through line 67, and flows into barometric condenser 68 within which a partial vacuum is maintained by means of ejector 69 which is supplied with steam through line 70.

Water vapor entering condenser 68 through line 67 is mixed with and condensed by cooling water entering the condenser through line 71, and the resulting stream of warm water is discharged through line 72 into hot well 73. Hot well 73 also receives the steam and non-condensable gases leaving ejector 69 through line 74, and the water in the well serves to condense that steam with the non-condensables escaping at and from the water surface. From the hot well product water is drawn off continuously through line 75 and conducted to product water outlet line 65. As is the case for the previously described concentrating operation, part of the product water may, if desired, be reused throughout the water recovery plant. As an alternative, all of the recovered water may be stored in a reservoir for use in applications where clean water is desired. The product water from the dehydration or drying operation may be combined with that from the concentrating operation, or product waters from the two operations may be kept separate.

The partially dehydrated slurry of waste solids in oil generated in first stage 62 of the drying evaporator is removed continuously through line 76, and discharged by pump 77 to second stage 78 of the evaporator. A procedure similar to that in the first stage of the evaporator is followed in the second stage thereof except that the pressure is usually higher, being close to atmospheric. The temperature of the essentially dehydrated waste solids and oil mixture collecting continuously in the sump of second stage 78 is in the range of about 150°–400°F and preferably about 200°–350°F, depending upon the pressure in the evaporator. The heating medium is steam which is at a temperature about 30°–50°F higher than the temperature of the anhydrous oil and waste solids slurry product, and is generated in boiler-furnace 44 which it leaves through line 45. Line 79 branches off of line 45 to convey steam to second drying stage 78. Condensate of the heating steam is withdrawn from the second stage of the drying evaporator through line 80 connecting into line 46, and is returned through the latter line by pump 47 to boiler-furnace 44. The product, a slurry of waste solids in oil containing about 1 percent by weight of water based on the whole material or about 5–10 percent referred to weight of non-fat solids, is withdrawn from the sump of second stage 78 by pump 81 and discharged by it through line 82 by which said slurry is conducted to centrifuge 85.

Level control in the second stage sump of the drying evaporator equipment is maintained by a level sensing element 83 in that sump which transmits signals to throttle valve 84 in line 76. Flow of the dry slurry of waste solids, oil and trace quantities of water from second stage 78 of the drying evaporator to centrifuge 85 is controlled directly by throttle valve 86 in line 82 on the discharge side of pump 81. The opening of this valve is controlled, in turn, by moisture sensing device 87 in the sump of the second stage. An excessively high moisture content of the slurry in the evaporator sump causes this valve to close part way with a consequent reduction in the flow of dehydrated slurry from the evaporator. As actuated respectively by level sensing device 83 and moisture sensing device 87, throttle valves 84 and 86 function together to maintain a proper level of suitably dry slurry of non-fat waste solids in oil in the sump of second stage 78 of the drying evaporator. A normal composition by weight of dry slurry leaving the evaporator through line 82 would be about 1 percent water, 15 percent non-fat solids, and 84 percent oil or fluid fats.

Centrifuge 85 separates the dehydrated waste solids in oil slurry into two streams. One of those streams, a stream of relatively clear oil, is discharged and delivered through line 88 to centrifuge oil tank 56. That oil, as described hereinbefore, is recycled or circulated back from tank 56 through line 57 by means of pump 58 to the outlet of centrifuge 8 through which are discharged the wet waste solids. Should the system generate oil in excess of that needed for fluidizing purposes, that is, that needed for the generation of a mixture of waste solids and oil which will remain fluid and pumpable in the absence of any water content, this excess or net product oil may be withdrawn from tank 56. The other stream from centrifuge 85, a stream containing substantially all of the waste solids entering the centrifuge but which is still about 30 percent to 40 percent oil by weight, is discharged and delivered through line 89 to a mechanical pressing apparatus 90 of a kind constructed and configured to effect substantial separation of the liquid and solid components of a liquids-solids mixture.

In the drawing, pressing apparatus 90 is suggestively in the nature of a reciprocating press or liquid-solid separator, for example, a piston-type, perforated barrel or curb or cage press such as that disclosed in U.S. Pat. No. 1,135,309 issued to E. T. Meakin on Apr. 13, 1915. It may be a press of this nature, but it may also be a press of any other suitable kind. In the general sense, of course, centrifuge 85 itself may be regarded as a liquid-solid separating press, one in which pressures or separating forces are generated dynamically rather than statically. It is within the contemplation of the present invention that certain dilute waste solids solutions or mixtures amenable to processing in accordance with its teachings will yield dry slurries at the sump discharge of second stage 78 of the drying or dehydrating evaporator which can be separated economically and adequately into their non-fat solids and liquid oil components by means of a single piece of mechanical equipment only, that is, for example, by either a centrifuge alone or a perforated barrel press alone.

Tow streams of material leave press 90, possibly intermittently depending upon the nature of the press. One of those, a stream of oil withdrawn from the press through line 91 by means of pump 92, represents the oil pressed out of the stream of essentially water-free but still oil-containing material delivered to the press through line 89 from centrifuge 85. As shown, that oil mixes with and further fluidizes the dry slurry of oil and waste solids flowing from second stage 78 of the drying evaporator to centrifuge 85. This is not the only way in which oil from the press can be handled. Such oil may, for instance, be sent directly to centrifuge oil tank 56.

Assuming that the dilute solids solution or mixture is originally oil-containing, the vigor of the operation performed in and by press 90 will determine whether or not the system generates a net oil product which can be withdrawn. Pressing down to just a "break even" level of residual oil in the waste solids will allow the system to function without the addition of any oil or fat except the quantity needed for start-up purposes, but also without the possibility of generating any net oil product. Pressing to a higher level than the "break even" level, that is, a level at which there is more residual oil in the pressed waste solids than there was oil originally associated with those solids in the dilute waste solids solution feed material flowing into the system through line 1, will not only eliminate the possibility of a net oil product but also require that the system be supplied continuously with oil or fluid fat for makeup purposes.

The other stream of material leaving press 90, a stream of pressed, dry waste solids withdrawn from the press through or along line or conveyor track 93, is delivered to grinder or comminutor 94. Those solids, in cake or chunk form upon ejection from press 90, will contain some oil or fat, but desirably no more than about 20 percent by weight, and most desirably fat in an amount less than about 15 percent by weight. By means of grinder 94 the pressed solids are reduced to granular if not powder form, and from the grinder they flow through line 95 to the suction side of blower 96. The blower discharges the comminuted waste solids as fuel through line 97 to boiler-furnace 44. Alternatively, boiler-furnace 44 may be by-passed and the waste solids withdrawn through line 98 for employment outside the illustrated system.

When the process and apparatus of this invention are used for the treatment of a dilute solution of waste solids that is not able to provide combustible solids at a rate sufficient to meet all fuel requirements for steam generation, or when the recovered solids are to be employed outside the system, supplemental fuel in the form of fuel oil or any other suitable material is fed to boiler-furnace 44 through line 99. When the fuel employed in the boiler-furnace is of such a nature as to leave a residual ash or non-combustible mineral matter this ash may be recovered by means of cyclones and dust collectors, its removal from the boiler furnace being by way of line 100.

As stated hereinbefore, it is an object of the present invention to provide a process and an apparatus for the recovery of water in essentially clean form from dilute solutions of waste solids, i.e., water of evaporated water quality. The cleanliness of water may be determined by its so-called Biological Oxygen Demand, hereinafter referred to as BOD, and its so-called Chemical Oxygen Demand, hereinafter referred to as COD. The BOD and the COD are due to the presence in water of organic compounds which are often low in molecular weight, water-soluble and steam-distillable, although suspended non-distillable organic matter also contributes to the BOD and the COD. Typical of low molecular weight compounds are aldehydes, ketones, esters, alcohols, fatty acids, amines, etc. Concerning BOD, bacteria metabolize certain of these organic compounds. Accordingly, BOD may be measured in a known manner such as by adding bacteria and oxygen to the sample of water to be tested and measuring the amount of oxygen used up by the bacteria in metabolizing the organic compounds. Conventional apparatus such as a Warburg manometer may be used. The amount of oxygen consumed is a measure of the BOD. COD, on the other hand, is a measure of the chemically oxidizable organic material present. The COD is determined by adding a known quantity of potassium permanganate to the water sample and back-titrating with ferrous ammonium sulfate to determine the quantity of potassium permanganate remaining. The difference gives the amount of potassium permanganate used to oxidize the chemically oxidizable organic material and is a measure of the COD. The BOD is usually, but not always, about sixty percent of the COD. Units are identical, with values being expressed customarily in milligrams per liter (mg/l).

Organic materials responsible for BOD and COD are generally present in dilute solutions of waste solids that are amenable to being treated by the apparatus and process of this invention. Materials contributing to BOD and COD may, to be sure, be formed as thermal decomposition products in the concentrating and final dehydration or drying operations of this invention, but only to a minimal extent. It is clearly desirable that water recovered from dilute solutions of waste solids be as low as possible in both BOD and COD. The advantages of the present invention in recovering essentially clean water from such solutions or dispersions are apparent from a consideration of the following. The recovered water is free of suspended organic matter by virtue of being obtained by evaporation followed by condensation, there being essentially no entrainment of solid material. The concentrating operation, being performed in the absence of oil, is carried out at relatively low temperatures. Accordingly, steam distillation of organic compounds is at a minimum. Furthermore, the low temperatures employed in the concentrating operation cause the formation of fewer thermal decomposition products which contribute to BOD and COD.

In the final dehydration or drying operation, carried out in the presence of oil, higher temperatures are required to drive off the remaining water. Hence the water recovered from the drying operation, i.e., the water recovered in line 65, has a higher content of organic compounds which give a higher BOD and COD than the water recovered from the concentrating operation, i.e., the water recovered in line 19. However, as much as 95 percent of the total recovered water may be a product of the concentrating operation with only about 5 percent thereof coming from the drying operation, and in practically any actual case at least much more water will be recovered in the former operation than in the latter one. Therefore, if the recovered water from the concentrating operation be combined with that from the drying operation the BOD and the COD will not be unacceptably high, and indeed will ordinarily be quite low since water recovered from the drying operation is only a minor component of the whole recovery. Alternatively, the water recovered from the concentrating operation may be kept separate from that recovered from the final dehydration or drying operation if particularly clean water be desired.

The following example will serve to illustrate how by employing the process of the present invention essentially clean water may be recovered from dilute solutions of waste solids.

EXAMPLE

Dilute solutions of waste solids from various sources, i.e., pharmaceutical wastes, cannery wastes and vegetable oil refinery wastes, were treated according to the process of this invention. The initial BOD's and COD's of the waste solids in dilute solution and the BOD's and COD's of the total recovered water, i.e., from the concentrating and drying operations taken together, were determined. The results are shown in the following table.

| Run No. | Initial COD | Recovered Water BOD | COD | BOD |
|---|---|---|---|---|
| Pharmaceutical Wastes: | | | | |
| 1 | 15,750 | 7,875 mg/l | 300 | 200 mg/l |
| 2 | 33,250 | 12,765 | 518 | 575 |
| 3 | 35,100 | 22,700 | 1,920 | 1,620 |
| Cannery Wastes: | | | | |
| 4 | 149,600 | 29,000 mg/l | 988 | 570 mg/l |
| 5 | 280,000 | 85,500 | 975 | 710 |
| Vegetable Oil Refinery Wastes: | | | | |
| 6 | 30,600 | 20,200 mg/l | 350 | 300 mg/l |

An examination of the data in the above table shows the marked decrease in BOD and COD in water recovered from dilute solutions of waste solids derived from several sources when the water recovery is effected according to the process of this invention.

While a specific embodiment of the present invention has been shown and described in detail to illustrate the utilization of the inventive principles, it is to be understood that that showing and description have been offered only by way of example and not of limitation. In particular it is desired to point out that condensers 22 and 68 which are shown as barometric condensers could just as well be surface condensers. Condensers of the latter nature would be useful to keep the cooling water, i.e., the water supplied through lines 25 and 71, separate from the system condensate product water, especially in circumstances in which the cooling water is not derived from the product water itself but instead comes from some ordinary, less than adequately clean source such as a stream, lake or river. Indeed in the test runs of which the results are tabulated above the condenser cooling water was not derived initially from the product water and was not mixed subsequently with water or vapor leaving the evaporators. Of course it is within the contemplation of the present invention that a portion of the condensate product water be used as cooling water for the condensers, especially if they be barometric condensers, after being suitably chilled or simply allowed to cool naturally.

In like manner it is contemplated that driving steam for ejectors 23 and 69 entering those devices through lines 24 and 70 and leaving them through lines 28 and 74 will be derived from the process, that is, generated in or taken off from boiler-furnace 44. Ejector steam from that source or some other will not in any event represent a contaminant as it is condensed in hot wells 27 and 73 and mixes with and becomes part of the product water flowing in lines 19 and 65. Just as it is not required that condensers 22 and 68 be barometric condensers, however, it is also not required that the vacua on those condensers be produced by ejectors driven by steam or any other fluid. Mechanical vacuum pumps could be used in place of the ejectors so far as the purposes of the present invention are concerned. If mechanical pumps were employed in the service in question hot wells 27 and 73 would become unnecessary at least for any purpose of acting as condensers, and the condensate flowing through lines 26 and 72, that is, the condensate of the steam evolved from the first stage vapor chambers of the evaporators would flow directly into product water lines 19 and 65 without any mixing except for mixing with condenser cooling water in the event that condensers 22 and 68 are barometric condensers as shown.

Protection by Letters Patent of this invention in all its aspects as the same are set forth in the appended claims is sought to the broadest extent that the prior art allows.

We claim as our invention:

1. A process for recovering clean water from dilute solutions of waste solids, said process comprising the steps of (1) concentrating a dilute aqueous solution of waste solids by heat evaporation to yield water vapor and a concentrated solution of waste solids; (2) condensing said water vapor and recovering the resulting condensate as a clean water product; (3) admixing said concentrated solution of waste solids with a relatively non-volatile oil to obtain a mixture which will remain fluid and pumpable after the removal of the water content therefrom; (4) dehydrating the resultant oil-containing mixture by heat evaporation to yield water vapor and a substantially anhydrous waste solids in oil slurry, and (5) condensing said water vapor from dehydration step (4) and recovering the resulting condensate as a clean water product.

2. The process of claim 1 wherein concentration step (2) is carried out at temperatures in the range of about 70° to 250°F and dehydration step (5) is carried out at temperatures in the range of about 70° to 400°F.

3. An apparatus for recovering clean water from dilute solutions of waste solids, said apparatus comprising (1) a tank adapted to receive a stream of a dilute aqueous solution of waste solids, (2) a first evaporator, (3) a conduit extending from said tank to said first evaporator wherethrough may flow a stream of said dilute solution of waste solids from said tank into the evaporating region of said first evaporator, (4) a first condenser, (5) a conduit extending from said first evaporator to the condensing region of said first condenser through which may flow water vapor formed as a result of concentrating said dilute solution of waste solids by heat evaporation, (6) means for withdrawing water vapor condensate from said first condenser as a clean water product, (7) a second evaporator, (8) a combustion apparatus associated with both said evaporators for supplying evaporative heat thereto, (9) a conduit extending from said first evaporator to the evaporating region of said second evaporator wherethrough may flow a stream of a concentrated solution of waste solids from said first evaporator, (10) an oil reservoir, (11) means for transmitting oil from said oil reservoir to said conduit extending from said first evaporator to said second evaporator whereby a resultant mixed stream of concentrated solution of waste solids and oil may be conducted into the evaporating region of said second evaporator, (12) a second condenser, (13) a conduit extending from said second evaporator to the condensing region of said second condenser through which may flow water vapor formed as a result of dehydrating said mixture of concentrated solution of waste solids and oil by heat evaporation, and (14) means for withdrawing water vapor condensate from said second condenser as a clean water product.

4. An apparatus for recovering clean water from dilute solutions of waste solids, said apparatus comprising (1) a tank adapted to receive a stream of a dilute aqueous solution of waste solids, (2) separator means adapted to divide said dilute solution of waste solids into a relatively concentrated waste solids solution fraction and a relatively very dilute waste solids solution fraction, (3) a conduit extending from said tank to said separator means wherethrough may flow a stream of said dilute solution of waste solids to be separated, (4) a first evaporator, (5) a conduit extending from said separator means to said first evaporator through which may flow a stream of said relatively very dilute waste solids solution fraction from said separator means into the evaporating region of said first evaporator, (6) a first condenser, (7) a conduit extending from said first evaporator to the condensing region of said first condenser through which may flow water vapor formed as a result of concentrating said relatively very dilute waste solids solution fraction by heat evaporation, (8) means for withdrawing water vapor condensate from said first condenser as a clean water product, (9) a second evaporator, (10) a combustion apparatus associated with both said evaporators for supplying evaporative heat thereto, (11) a conduit extending from said first evaporator to the evaporating region of said second evaporator through which may flow a stream of concentrated solution of waste solids from said first evaporator, (12) an oil reservoir, (13) means for transmitting oil from said oil reservoir into the region of said separator means wherefrom is discharged said relatively concentrated waste solids solution fraction, (14) means for conducting the resultant mixture of concentrated solution of waste solids and oil from the separator means into said conduit extending from said first evaporator to the evaporating region of said second evaporator, (15) a second condenser, (16) a conduit extending from said second evaporator to said second condenser through which may flow water vapor formed as a result of dehydrating said mixture of concentrated solution of waste solids and oil by heat evaporation, and (17) means for withdrawing water vapor condensate from said second condenser as a clean water product.

5. The apparatus of claim 4 wherein said first evaporator and said second evaporator are both multistage evaporators and each is adapted to have fluid material to be heated and evaporated in it and vaporous material to effect this heating and evaporating flow through it countercurrently.

6. The apparatus of claim 4 wherein said combustion apparatus associated with both said evaporators comprises a boiler-furnace for the generation of steam and wherein further there are conduit means extending from said boiler-furnace to said evaporators wherethrough heating steam may flow from said boiler-furnace to said evaporators.

7. The apparatus of claim 4 which further comprises a pressing apparatus adapted to effect a separation of said mixture of concentrated solution of waste solids and oil into its components of substantially oil-free waste solids and an oil following dehydration of said mixture in said second evaporator, and a conduit extending from said second evaporator to said pressing apparatus through which a dehydrated mixture of waste solids and oil may flow from said second evaporator to said pressing apparatus.

8. The apparatus of claim 7 which further comprises a conduit extending from said pressing apparatus to said oil reservoir through which oil separated from said dehydrated mixture of waste solids and oil may flow from said pressing apparatus to said oil reservoir.

9. The apparatus of claim 7 which further comprises conveying means extending from said pressing apparatus to the furnace region of said boiler-furnace whereby substantially oil-free waste solids separated from said dehydrated mixture of waste solids and oil may be transferred from said pressing apparatus to said furnace region to be burned therein as fuel for the generation of steam.

10. A process for recovering clean water from dilute solutions of waste solids, said process comprising the steps of (1) separating a dilute aqueous solution of waste solids into a relatively concentrated waste solids solution fraction and a relatively very dilute waste solids solution fraction; (2) concentrating said relatively very dilute waste solids solution fraction by heat evaporation to yield water vapor and a concentrated solution of waste solids; (3) condensing said water vapor and recovering the resulting condensate as a clean water product: (4) combining said relatively concentrated waste solids solution fraction from step (1) with a relatively non-volatile oil and further with said concentrated solution of waste solids from step (2) to obtain a mixture which will remain fluid and pumpable after the removal of the water content therefrom; (5) dehydrating the resultant oil-containing mixture by heat evaporation to yield water vapor and a substantially anhydrous waste solids in oil slurry, and (6) condensing said water vapor from dehydration step (5) and recovering the resulting condensate as a clean water product.

11. The process of claim 10 which further comprises the step of separating said anhydrous waste solids in oil slurry to give a dry and substantially oil-free waste solids product and an oil.

12. The process of claim 11 which further comprises the step of utilizing at least part of the oil resulting from the separation of said waste solids in oil slurry as at least part of the oil combined with said relatively concentrated waste solids solution fraction from step (1) and said concentrated solution of waste solids from step (2).

13. The process of claim 11 which further comprises the step of utilizing at least part of the substantially oil-free waste solids product resulting from the separation of said waste solids in oil slurry as at least part of the fuel for supplying evaporative heat for said concentration and dehydration steps (2) and (5).

* * * * *